Sept. 22, 1925.
A. B. THOMPSON
1,554,928
MOTOR FOR AUTOMATIC WINDSHIELD CLEANERS
Filed June 8, 1921
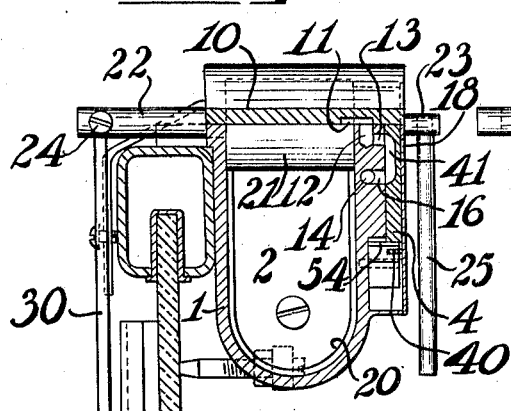
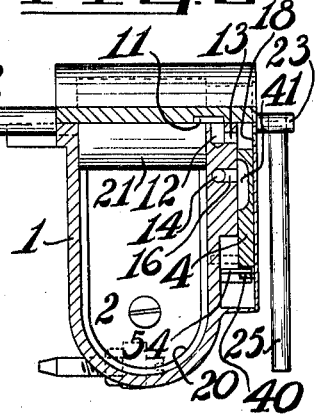
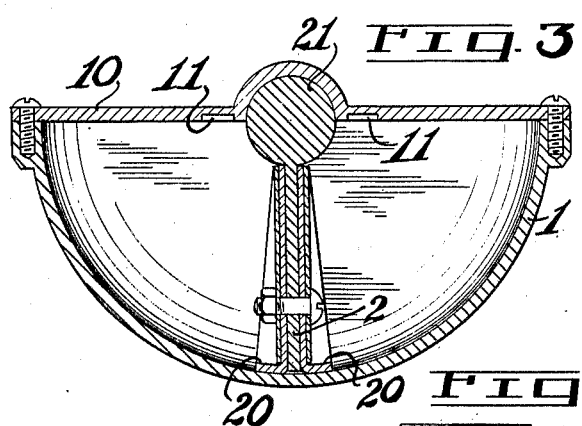
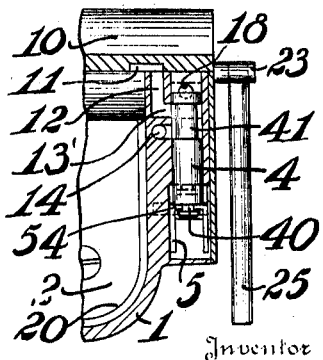
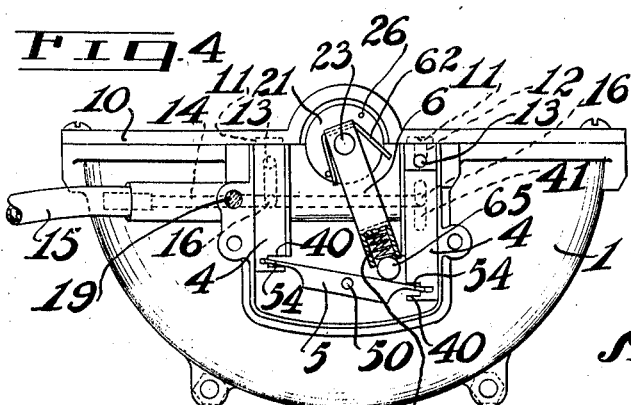
Inventor
Arthur B. Thompson
By N.L. & C.L. Reynolds
Attorneys Patented Sept. 22, 1925.

1,554,928

UNITED STATES PATENT OFFICE.

ARTHUR B. THOMPSON, OF SEATTLE, WASHINGTON, ASSIGNOR TO JOHN R. OISHEI, OF BUFFALO, NEW YORK.

MOTOR FOR AUTOMATIC WINDSHIELD CLEANERS.

Application filed June 8, 1921. Serial No. 476,089.

*To all whom it may concern:*

Be it known that I, ARTHUR B. THOMPSON, a citizen of the United States of America, and resident of the city of Seattle, in the county of King and State of Washington, have invented certain new and useful Improvements in Motors for Automatic Windshield Cleaners, of which the following is a specification.

My invention relates to automatically actuated wipers for windshields and the like.

An object of my invention is to provide a compact, light, easily operable wiper or swipe including means for causing its automatic reciprocation or oscillation.

Another object is to provide control means for a power-driven windshield wiper which will be actuated by the movement of the wiper itself or a connected part to reverse the movement thereof at the end of each stroke.

My invention comprises those novel parts and combinations thereof which are shown in the accompanying drawings, described in the specification, and particularly defined by the claims terminating the same.

In the accompanying drawings I have shown my invention in the form which is now preferred by me.

Figure 1 is a section through a windshield and portions of the operating mechanism of my wiper.

Figure 2 is a similar section through the operating mechanism, showing parts in the reversed position from that shown in Figure 1.

Figure 3 is a sectional view taken at right angles to Figure 1.

Figure 4 is an elevation of the control mechanism with a cover plate removed.

Figure 5 is a view similar to Figure 1, illustrating a modification.

A casing 1, of generally semi-circular outline, is provided with a tightly-fitting cover 10. A piston vane 2, which may be provided with flexible packing cups 20 upon opposite sides, is oscillatable within the casing 1. The vane 2 is shown as projecting from a stub shaft 21, a reduced portion 22 of which projects from the casing. A reduced portion 23 may also project from the opposite end of the casing. The portion 22 is provided with means for the attachment of a wiper 3 of any suitable form, shown herein as having a supporting wire 30, the end of which passes through a suitable hole in the portion 22 and which is secured therein by means of a set screw 24. The projecting portion 23 of the shaft 21 may have a handle 25 secured therein for hand operation of the wiper when this is desired. It will be seen that the piston 2 is directly connected to the wiper 3 and that the wiper oscillates exactly as does the piston 2.

Oscillation of the piston 2 may be accomplished in any suitable manner. I prefer that this be accomplished by means of suction, and have shown a conduit 15 connecting the casing 1 with a suitable suction inducing means. This might conveniently be the suction of the engine itself, in an automobile, and the conduit 15 might then be connected conveniently to the intake manifold of the engine (not shown). For use upon street cars, where compressed air is available, the type shown in Figure 5 may be used.

Suitable means must be provided for controlling the application of the suction first to one side of the piston 2 and then to its other side. I have shown the cover plate 10 as provided with a port 11 at each side of the piston which, when the cover is in place, is registrable with a port 12 having a laterally extending branch 13 extending to the outside of the casing. The conduit 15 is connected to a suction passage 14 in the casing wall, and the passage 14 has a pair of laterally extending branches 16 positioned adjacent the branches 13. Valves 4 are provided, which have passages 41 adapted, when the valve is properly positioned, to connect the passages 13 and 16. In one position of the valve these passages are connected but in the other position of the valve the passage 13 is open to the atmosphere but the passage 16 is closed off entirely. By reciprocating these valves alternately, one end of the casing 1 is connected to a suction inducing means while the other is connected to the atmosphere.

At their lower ends the valves 4 are provided with transverse slots 40. A lever or valve shifting part 5, pivoted at 50 between its ends 54, has these ends engageable in the slots 40 of the valves 4. Tilting of the valve shifting part 5, therefore, causes the alternate and opposite actuation of the valves 4 to reverse the piston travel, as described above. As a means for moving the lever 5, I have shown a kicker or arm 6 which may be pivoted coaxially with but which is independent of the shaft 21. I have shown the kicker 6 as loosely mounted upon the reduced portion 23 of the shaft. Pins 26 secured in the shaft 21 are engageable with the kicker 6 to oscillate it. Preferably the engagement of the pins 26 with the kicker 6 is through the medium of a spring 62. The object of this spring is to cause the kicker 6 to move positively and rapidly across the point where it is in alinement with the pivot 50 of the tiltable valve shifting lever to the end that the lever will not be hung on dead-center and so cause faulty operation of the valves. A further object of the spring is to initiate reverse movements of the vane or piston. Thus, for example, when the device is in the position illustrated in Fig. 4, the vane or piston is at the end of its stroke at the right hand end of the casing and one of the pins 26 is bearing on an end of the spring 62 so that that end of the spring is flexed or bent from its normal position. In this position of the device, the valves have just been changed and the left hand side of the casing has just been placed under suction. Therefore, as soon as this is done and the air pressure at the left hand side of the vane or piston is relieved, the compressed end of spring 62 moves the pin with which it is engaged outwardly, thereby moving the vane or piston and starting the reverse stroke thereof. A similar operation ensues when the piston reaches the other end of the casing, whereupon the other end of the spring serves to move the other pin 26 for starting the piston back in the reverse direction. This results in a very prompt reversal of the piston, in an initial movement of the piston during that brief interval in which the suction is building up in the casing, and prevents the piston from lying idle momentarily at either end of the casing, and prevents the piston or vane from binding or becoming stuck at either end of the casing, owing to any cohesive qualities the lubricant used in the device might have and which in some instances tends to form a bond between the side or edges of the piston and the sides of the casing at the end of the stroke if the piston or vane is permitted to remain momentarily at rest. The kicker 6 may have at its outer end, interposed between itself and the valve shifting lever 5 a spring-pressed ball 65, whereby it is in continuous yielding engagement at all times with the lever 5 the compression spring 65' preferably being carried by the kicker 6 and acting to positively move the valve shifting lever 5 and the valves to their limit positions and maintain them therein during the major portions of the piston stroke, thereby ensuring positive operation on starting the device even after the motor is stopped with its piston in a mid-stroke position and the device subjected to the normal jolts and vibration as usual upon the windshield of an automobile.

When the conduit 15 is connected to the suction inducing means the suction is communicated to the interior of the casing upon one side of the piston 2 through the passages, 14, 16, 41, 13, 12, and 11. A set screw 19 in the passage 14 controls the strength of the suction. The piston moves toward this side of the casing, air being admitted behind it through the passages 13, 12, and 11, of the opposite side, this passage 13 being not covered by its valve 4. The pins 26 moving with the piston will, near the end of the piston stroke, actuate the kicker arm 6 to move it across the pivot 50 of the tiltable valve shifting lever 5. This action causes the lever 5 to tilt and reverses the position of the valves 4. This connects the suction inducing means through duplicates of the passages described above with the casing upon the opposite side of the piston 2 and connects with the atmosphere that side of the casing which was formerly in connection with the suction inducing means. The piston then travels in the reverse direction until the position of the valves is again reversed in the same manner.

In Figure 5 I have shown a construction which is intended particularly for actuation by compressed air, as upon a street car. The passage 14 is connected to a source of air under pressure. The port 13', which connects through ports 12 and 11 to the interior of the casing 1, is never open directly to the atmosphere, but is always connected with the passage 41 of the valve 4. An extra port 18, leading to the atmosphere, is so positioned that when the valve is raised as shown in dotted lines, it communicates with the valve passage 41, and, through the port 13', with the interior of the casing to exhaust the pressure therein. When the valve is lowered as shown in full lines exhaust from the casing is cut off, and air under pressure is supplied thereto. Thus the piston vane 2 is actuated by air under pressure.

In so far as the actuating mechanism described above is concerned, it is not essential that the piston be a vane oscillatable within a substantially semi-circular casing, and it is not essential whether the casing or the piston be a fixed member. In so far as the particular valve-actuating or control mechanism is concerned any of the well-known equivalents of the piston and casing described may be employed.

What I claim as my invention is:

1. Actuating means for a windshield wiper comprising a casing and a piston member movable therein, said casing having a port communicating with each side of the piston member, a pair of reciprocable valves each controlling its port to connect each side of the casing alternately with the atmosphere and with a suction-inducing means, a centrally-pivoted tiltable lever having each end connected with a valve, an oscillatable arm having yielding engagement with and adapted to actuate said lever, oscillatable pins operatively connected to the piston, and engageable near the end of the piston's stroke with said arm to oscillate it, and a spring interposed between said arm and pins to carry the arm past alinement with the center of said lever.

2. In a fluid motor arranged and adapted to be mounted on an automobile adjacent the windshield thereof and adapted to operate on low vacuum induced atmospheric air pressures as obtained by connecting the motor with a suction passage from the automobile engine, a casing, a piston in said casing, cooperating means for alternately admitting atmospheric air to the sides of said piston in said casing and for alternately connecting the opposite sides of the piston with the source of suction, said means including a suction passage in said casing, valve mechanism and ports for alternately connecting said suction passage to the sides of said piston, a pivoted valve shifting member, a valve kicker mounted to be moved first in one direction and then in the other by said piston as it nears the limits of its stroke, and a compression spring interposed between said kicker and said pivoted valve shifting member, whereby as said kicker is moved said spring causes pressure to bear on said valve shifting member at points first on one side and then on the other side of the pivotal axis of said valve shifting member to shift said valve shifting member and valve mechanism to alternately connect said casing at the sides of said piston to the suction passage and to the atmosphere and to maintain said connections during a predetermined portion of the piston stroke.

3. In a fluid motor arranged and adapted to be mounted on an automobile adjacent the windshield thereof and adapted to operate on low vacuum induced atmospheric air pressures as obtained by connecting the motor with a suction passage from an automobile engine, a casing, a suction passage in said casing adapted to be connected with said source of suction, a piston in said casing movable to and from two spaced limit positions in said casing, a rock shaft adapted to receive the member to be operated by said motor, valve and valve operating mechanism including a kicker moved with said rock shaft from one position to another as the piston moves in the casing, a valve shifting member and valve means movable from a position to connect the casing at one side of said piston to the suction passage and to admit atmospheric air to an opposite side of said casing, to a position to admit atmospheric air to said casing at said one side of said piston and to connect the opposite side of said casing to the suction passage, and a spring connected at one end to said kicker and interposed between said kicker and said valve shifting member and adapted to be stressed by said kicker as it is moved by said rock shaft to quickly shift said valve shifting member to said positions when the piston and kicker have moved a predetermined distance and to maintain said valve shifting member in said positions while said piston is moving and until it has moved a predetermined distance in the reverse direction.

4. In a fluid motor arranged and adapted to be mounted on an automobile adjacent the windshield thereof and adapted to operate on low vacuum induced atmospheric air pressures as obtained by connecting the motor with a suction passage from an automobile engine, a casing, a swinging vane piston movable to and from two limit positions in said casing, a rock shaft mounted to move in unison with said piston and having a portion projecting from said casing, valve actuating parts on said rock shaft, a suction passage in said casing, a pair of suction and atmospheric ports to said casing at opposite sides of said piston, valve means supported from a pivot point substantially midway of the limit points of said piston stroke and in substantial vertical alinement with the axis of said rock shaft and movable to and from two limit positions for subjecting the interior of the casing at opposite sides of said vane to the influence in said suction passage, a spring interposed between said valve actuating parts and said valve means and having an end shiftable from one side to the other side of the pivotal point of said valve means and adapted to quickly snap said valve means to their limit positions and to maintain them in said limit positions during a predetermined portion of the piston stroke.

5. In a fluid motor arranged and adapted to be mounted on an automobile adjacent the windshield thereof and adapted to operate on low vacuum induced atmospheric air pressures as obtained by connecting the motor with a suction passage from the internal combustion engine of the automobile, a casing, a piston movable in said casing, a member movable in unison with said piston to and from spaced limit positions, a fixed suction passage in said casing, a pair of ports communicating with portions of said casing at opposite sides of said piston, valve means for alternately connecting said fixed suction passage to said ports and for admitting atmospheric air to a side of said piston when said side is not in communication with said suction passage, said valve means including a valve having a flat contact surface with a blind recess therein, said recessed portion being adapted to register with said ports and adapted to establish intermittent communication between said fixed suction passage and one of said ports, a valve kicker, parts on said member movable in unison with said piston for engaging said kicker after said piston has traveled a predetermined distance to move said kicker in unison with said piston, said valve means including a valve shifting part, and a spring interposed between said kicker and said valve shifting part adapted to shift said valve means when the kicker has moved a predetermined distance and to resiliently hold said valve means in said shifted position until the piston has traveled a predetermined distance in the reverse direction.

6. In a portable fluid motor adapted to operate on low pressures as obtained by connecting the motor with a suction passage between an internal combustion engine and the fuel supply therefor, an arcuate piston chamber, a rock shaft extending across the upper portion thereof, and an oscillatable vane carried thereby, a suction passage adjacent said piston chamber, valve mechanism for controlling communication between said suction passage and each end of the piston chamber alternately, including a port reaching through the wall of the piston chamber to each end thereof, a vertically movable slide valve slidably mounted on the wall of said piston chamber adjacent to each of said ports, the sliding face of each valve being cut away to provide a recess therein, a balance lever pivotally mounted between the slide valves, an operative connection from each end of the balance lever to the adjacent slide valve, and means actuated by said shaft for tilting said balance lever to operate said valves.

7. In a portable fluid motor adapted to operate on low pressures as obtained by connecting the motor with a suction passage between an internal combustion engine and the fuel supply therefor, an arcuate piston chamber, a rock shaft extending across the upper portion thereof, an oscillatable vane carried thereby, a suction passage adjacent said piston chamber, valve mechanism for controlling communication between said suction passage and each end of the piston chamber alternately, including a port reaching through the wall of the piston chamber to each end thereof, a vertically movable slide valve slidably mounted on the wall of said piston chamber adjacent to each of said ports, the sliding face of each valve being cut away to provide a recess therein, a balance lever pivotally mounted between the slide valves, an operative connection from each end of the balance lever to the adjacent slide valve, an arm pivotally mounted on the wall of said piston chamber and adapted to engage said balance lever and movable thereon to operate said valves, and means on said rock shaft adapted to engage said arm to actuate said arm when said piston vane is moved.

Signed at Seattle, King County, Washington, this 12th day of May, 1921.

ARTHUR B. THOMPSON.